United States Patent
Boyle

[11] 3,953,829
[45] Apr. 27, 1976

[54] PARTIALLY FILLED FLUID DAMPED GEOPHONE

[75] Inventor: Charles F. Boyle, Jackson, Mich.

[73] Assignee: Sparton Corporation, Jackson, Mich.

[22] Filed: Feb. 18, 1975

[21] Appl. No.: 550,830

[52] U.S. Cl. .............................. 340/17 R; 73/71.2; 340/8 LF
[51] Int. Cl.² ........................................... G01V 1/18
[58] Field of Search ................... 340/8 LF, 14, 17; 73/71, 71.2

[56] References Cited
UNITED STATES PATENTS

| | | | |
|---|---|---|---|
| 2,890,438 | 6/1959 | Bardeen | 340/17 |
| 3,065,456 | 11/1962 | Alexander | 73/71 |
| 3,157,852 | 11/1964 | Campbell et al. | 340/17 |
| 3,577,184 | 5/1971 | McNeel | 340/17 |
| 3,602,490 | 8/1971 | Mueller | 340/17 |
| 3,611,280 | 10/1971 | Sheehy | 340/17 |
| 3,633,053 | 1/1972 | Peters | 340/17 |
| 3,718,900 | 2/1973 | Holmes, Jr. | 340/17 |
| 3,738,445 | 6/1973 | Wilson et al. | 340/17 |
| 3,878,504 | 4/1975 | Sears | 340/17 |
| 3,890,606 | 6/1975 | Florian et al. | 340/17 |

Primary Examiner—Maynard R. Wilbur
Assistant Examiner—H. A. Birmiel
Attorney, Agent, or Firm—Beaman & Beaman

[57] ABSTRACT

The invention relates to geophones and/or seismometers utilizing a casing housing a permanent magnet and a coil mass resiliently supported within the casing for movement relative to the permanent magnet along a primary axis, and wherein the mass is movably supported relative to the casing upon diaphragm springs utilizing involute spring elements. Undesirable vibrational responses occurring in the diaphragm springs resulting from orthogonal forces are suppressed by partially filling the void within the casing with a damping fluid wherein the several involute spring elements of a spring are immersed or exposed to the damping fluid in varying degrees to damp resonant narrrow band orthogonal vibrations within the spring elements and permit accurate sensing along the primary axis over wide frequency ranges.

3 Claims, 5 Drawing Figures

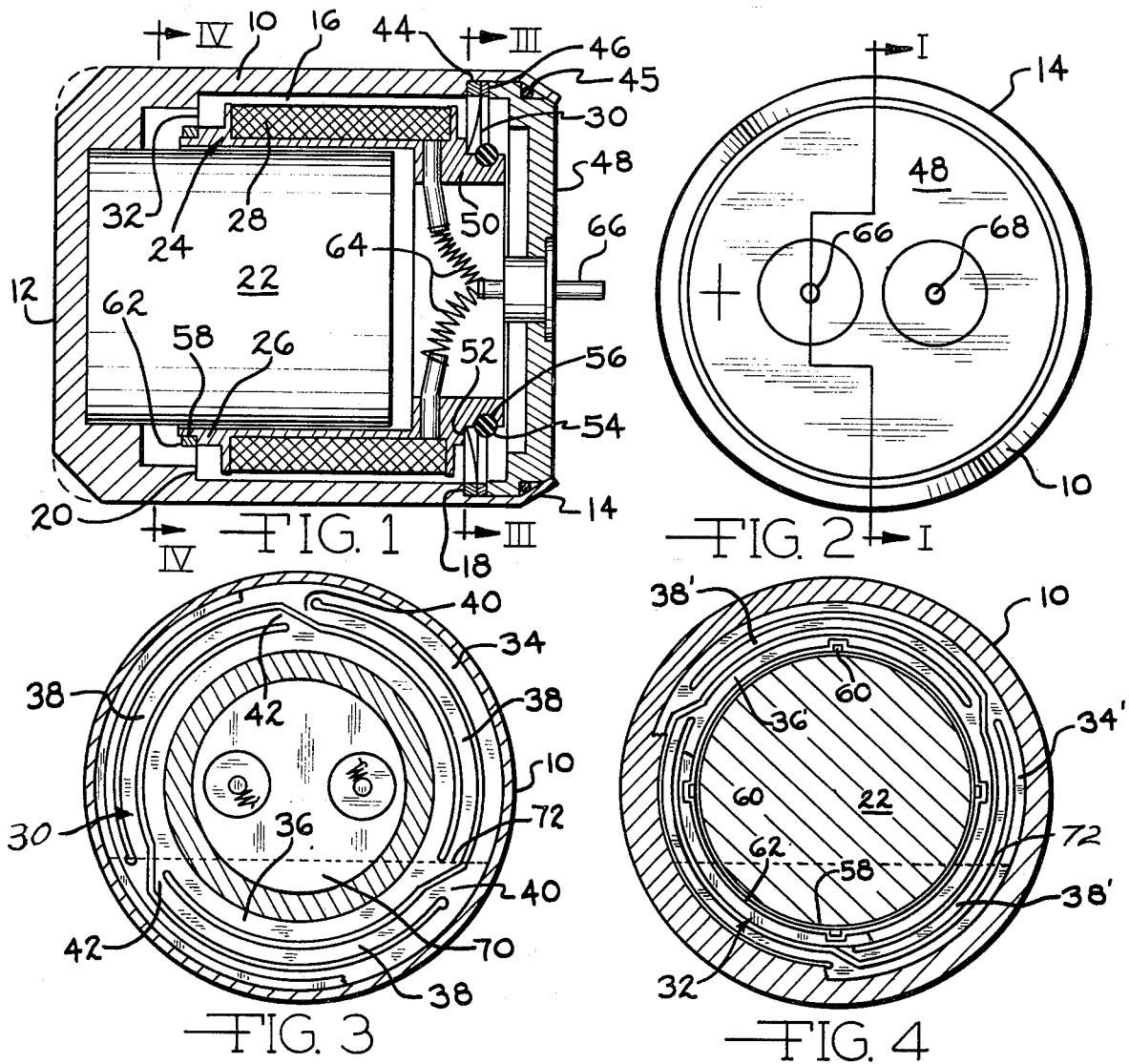
FIG. 1  FIG. 2
FIG. 3  FIG. 4
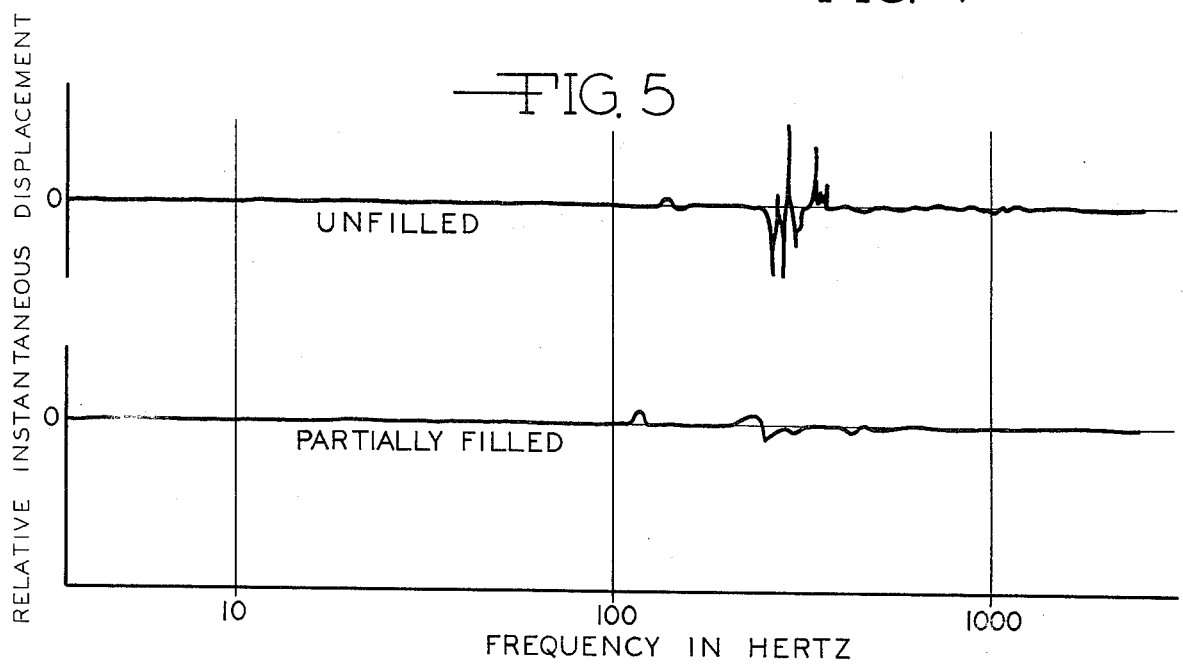
FIG. 5

PARTIALLY FILLED FLUID DAMPED GEOPHONE

BACKGROUND OF THE INVENTION

The invention pertains to vibration sensing transducers, and particularly relates to geophones having a wide frequency range of operation along a primary axis and wherein damping means are utilized to suppress vibrations orthogonal to the primary axis of response.

Geophones and/or seismometers are widely used in the geophysical industry for measuring geophysical characteristics such as in oil exploration, and such devices are also widely used in military applications for sensing personnel or vehicular activity. Geophones are also utilized in underwater sound sensing electroacoustic transducers or hydrophones, as illustrated in the assignee's U.S. Pat. No. 3,720,909.

One of the common constructions for geophones includes the mounting of a mass, such as an annular wound coil, resiliently within the chamber of a casing and a permanent magnet affixed to the casing is located within the coil mass. The mass is mounted upon diaphragm springs having involute spring elements permitting relative movement between the coil mass and magnet along a primary axis of response. This relative axial movement as produced by vibrations imposed upon the casing produces electrical signals as the coil windings cut the lines of magnetic flux which are sensed and evaluated. Examples of this type of geophone or seismometer is shown in U.S. Pat. Nos. 3,239,804 and 3,451,040.

While the utilization of diaphragm springs having involute ribbon spring elements results in a concise spring with a low spring constant, and the sensing of vibrations along the primary response axis is sensitive, this type of diaphragm spring is subject to sensing and reacting to orthogonal or cross axis forces imposed upon the mass, and springs, which induce axial vibrations of the mass which are sensed and results in undesirable signals extraneous to those signals desired. In order to control unwanted vibrations within diaphragm springs, several damping or control methods have been proposed, such as coating the springs, as shown in U.S. Pat. No. 3,157,852, or utilizing extraneous spring engaging support elements as shown in U.S. Pat. No. 3,344,397. Neither of these approaches to the problem have proven satisfactory in all respects, particularly in geophones having a wide operating frequency range, such as through 8 octaves, as from 10 hertz to 2400 hertz. In many geophone applications the operating frequency range desired covers no more than 4 or 5 octaves, 10 hertz to 100 hertz, as an example, and in many geophone applications there is minimal interest in determining to any degree the exactness of the plane or planes in which the force motion occurs. The relatively simple geophone devices of limited frequency range are not usable over an 8 octave range, for instance, particularly when it is desired to accurately resolve relative vibrations in two or three orthogonal planes by the utilization of a plurality of geophones. Most geophone devices exhibit undesirable responses at certain frequencies, such as an output voltage greater then 5% to 10% of the voltage obtained when a geophone is excited along the axis of maximum response, when excited in a plane orthogonal to the axis of primary response.

In addition to the natural resonant frequency of the mass and springs in a direction parallel to the primary axis of vibration, the sensing of a second resonant frequency is inherent in geophone systems utilizing diaphragm springs. This frequency results from the mass of the coil and the springs bending in the plane coincident with their diameter, which, of course, is orthogonal to the geophone primary axis. This undesirable cross axis resonant frequency is higher than the natural resonant frequency along the primary axis. Further, diaphgram springs exhibit a third motional characteristic called "buckling". When motion is applied to the mass perpendicular to the primary axis, and parallel to the plane coincident with the diameter of the springs, the involute elements of the springs under compression tend to buckle. Due to imperfections in the spring, and its type of mounting in the geophone assembly, the buckling action results in translation of the mass along the primary axis producing an undesired response. The buckling mode resonance is characterized by its narrow band or high amplitude response, and it is also relatively high in frequency.

The aforementioned vibrations in the diaphragm springs resulting from orthogonal forces or vibrations imposed upon the mass produce geophone signals that adversely affect the desired geophone output, and with broad range frequency transducers wherein a plurality of geophones are related to each other as in U.S. Pat. No. 3,720,909, such undesired responses seriously affect the ability of the transducer assembly in which the geophone is utilized to accurately evaluate orthogonal vibrations. Orthogonal responses produce primary axis vibrations relating to the orthogonal forces in relation to the cosine of the angle of such forces, and unless the sensitivity to the orthogonal forces can be effectively damped, the output of the geophone assembly is adversely affected. Tests have indicated that the buckling mode of vibration produces the majority of the undesired response characteristics, and observation indicates that diaphragm springs commonly have more than one buckling mode.

While it is known to use damping fluids in vibration sensing devices, such as geophones and the like, in the conventional use of such damping fluids the void in which the vibrating elements are located is completely filled with the fluid. Typical arrangements of this type are illustrated in U.S. Pat Nos. 2,677,270 and 2,696,592. Experiments with geophones utilizing diaphragm springs wherein the involute spring elements are completely immersed in a damping fluid have not achieved significant improvement over the aforementioned problems resulting from orthogonal or cross axis vibrations. In that the involute spring elements of the diaphragm springs are equally immersed and exposed to the damping fluid, the resonant frequency of the springs may be modified by the fluid, but the resonant frequency is merely shifted, rather than being effectively suppressed and damped. This shifting of the resonant frequency in a wide range geophone assembly provides little improvement over the aforementioned problems.

SUMMARY OF THE INVENTION

It is an object of the invention to provide a geophone utilizing a mass support upon diaphragm springs having involute spring elements wherein orthogonal or cross axis responses are effectively damped and suppressed over a wide frequency range, and where undesirable geophone responses due to spring buckling are significantly reduced.

In the practice of the invention a geophone is utilized consisting of a casing defining a chamber in which a coil mass is resiliently supported by a pair of diaphragm springs each having a plurality of involute spring elements spiralling in a direction about the primary axis of mass movement relative to the casing. A permanent magnet is located within the casing surrounded by the coil.

The void within the casing in which the coil mass and permanent magnet is located is partially filled with a damping fluid so that when the primary axis of geophone response, as defined by the coincident axis of the permanent magnet and the axis of movement of the coil mass, is substantially horizontal several of the spring elements of the diaphragm springs will be subjected to the damping fluid to various degrees. Also, in most instances, at least one of the spring elements will be completely free of contact with the damping fluid.

In the preferred mode of practice of the invention the void within the casing chamber, by volume, is one third filled with the damping fluid. Thus, at an approximately 33% filling, the upper level of the damping fluid will not reach the primary axis of the geophone, when horizontally disposed, and only those involute spring elements, or portions thereof, located below the primary axis will be in contact with the damping fluid. However, because of variations in design details of geophone structure, it is contemplated that a partially filled range of damping fluid between 25% to 75%, by volume, of the void within the casing will provide effective damping against orthogonal responses.

It will therefore be appreciated that in the practice of the invention the random engagement between the damping fluid and the involute spring elements produces a damping of the elements of a variable nature which is effective to suppress vibrations in the elements resulting from orthogonal responses.

BRIEF DESCRIPTION OF THE DRAWINGS

The aforementioned objects of the invention will be appreciated from the following description and accompanying drawings wherein:

FIG. 1 is a sectional, partially diametrical, view of a geophone in accord with the invention as taken along section I—I of FIG. 2, FIG. 2 is an elevational end view of a geophone as taken from the right of FIG. 1, FIG. 3 is an elevational, sectional view illustrating the front diaphragm spring structure as taken along section III—III of FIG. 1, FIG. 4 is an elevational, sectional view illustrating the rear spring structure as taken along section IV—IV of FIG. 1, portions of the casing being broken away to illustrate the rear spring outer rim, and FIG. 5 is a graph comparing orthogonal or cross axis vibrations in similar geophones in accord with the invention in unfilled and partially fluid filled embodiments.

DESCRIPTION OF THE PREFERRED EMBODIMENT

A typical geophone structure utilizing the concepts of the invention is shown in FIGS. 1 through 4. The geophone includes a cylindrical casing 10 having a closed end 12, and an accessible end defined by an inwardly deformable rim 14. The casing 10 defines a chamber 16 of a generally cylindrical configuration, and the inner wall includes radial shoulders 18 and 20, axially spaced with respect to each other.

A permanent magnet 22 is concentrically mounted within the casing chamber 16, and is a cylindrical configuration having one of its poles located within the casing end 12, and the other pole is located at the magnet right end, as viewed in FIG. 1. The longitudinal axis of the magnet 22 is coincident with the primary axis of the casing, and the primary axis of motion response of the geophone.

An annular mass 24 is concentrically located within the casing chamber 16 and circumscribes the major axial length of the magnet 22. The mass 24 includes an annular bobbin 26 upon which insulated wire is wound to define a coil 28. Together, the bobbin and coil constitute a mass axially displaceable with respect to the magnet 22, as later apparent.

The mass 24 is resiliently mounted with respect to the casing 10, and permanent magnet 22, by a pair of diaphragm springs 30 and 32, located adjacent opposite axial ends of the bobbin. The diaphragm springs 30 and 32 are of similar construction, but, in the illustrated embodiment, are of slight dimensional variation in that the maximum diameter of the spring 30 is greater than that of spring 32, and the minimum diameter of spring 30 is less than the minimum diameter of spring 32. With reference to FIG. 3, it will be appreciated that the diaphragm spring 30 includes an outer annular rim 34, and an inner annular rim 36. Three involute spring elements or ribbons 38 extend between the inner and outer rims interconnecting the rims, and as each element is of significant circumferential length, approximately 120°, the highly flexible nature of the spring due to its formation of a thin sheet of beryllium copper, as is known in the art, permits the inner rim 36 to be axially displaced relative to the outer rim 34 due to bending of the involute elements 38 within the length of the elements themselves, and adjacent the ends of the elements at 40 where the elements connect with the outer rim, and at 42 where the elements connect to the inner rim 36. As the spring 32 is similar to the spring 30, a description thereof is unnecessary, and equivalent components are indicated by primes in FIG. 4.

A ring 44 engages the casing shoulder 18, and the spring outer rim 34 engages the same. A second ring 46 engages the opposite side of the outer rim 34, and the circular cover plate 48 includes an edge engaging the ring 46 to maintain the assembly of the rings and outer rim. The casing rim 14 is deformed inwardly upon the periphery of the cover plate 48 to maintain the cover plate in firm assembly with the casing, and an O-ring 45 seals the cover plate with respect to the casing.

The spring inner rim 36 is received upon the bobbin circular hub 50 against shoulder 52, and is axially maintained in position by the resilient O-ring 54 received in groove 56 defined in hub 50.

The spring 32 is affixed to the bobbin 26 by inserting the inner rim 36' upon the cylindrical bobbin shoulder 58, and portions of the bobbin are staked at 60 against washer 62 to affix the spring to the bobbin. The outer rim of the spring 32 engages the casing shoulder 20, FIG. 1.

The coil 28 is electrically connected by conductors 64 to terminals 66 and 68 mounted in the cover plate 48 and extending therethrough. The conductors, not shown, connecting the geophone to the sensing apparatus are attached to the terminals 66 and 68.

From the aforedescription it will be appreciated that relative axial displacement between the mass 24 and the casing structure, including magnet 22, may occur along the primary axis of the casing. When the geophone casing is mounted within an assembly, such as shown in U.S. Pat. No. 3,720,909, or is mounted in other structure receiving horizontal vibrations, the magnet and casing will axially move relative to the mass 24 along the primary axis, and this relative movement is sensed by the creation of the electrical signals produced.

In the practice of the invention, the unoccupied void within the chamber 16 is partially filed with a damping fluid 70. As illustrated in FIGS. 1, 3 and 4 the preferred amount of damping fluid within the chamber 16 is approximately one third of the available void, and the upper surface of the damping fluid is represented by dotted line 72.

Of course, as the casing chamber is only partially filled with damping fluid the relative portions of the involute spring elements 38 engaged by the fluid for each spring varies. For instance, with the spring 30 oriented as in FIG. 3, the lower spring element 38 is completely immersed in the liquid, while only the portions 40 and 42 of the other two spring elements 38 are in contact with the liquid. However, as the springs 30 and 32, as apparent in FIG. 3, are rotationally displaced about the primary axis relative to each other, significant portions of two of the spring elements 38' are immersed in the fluid. The rotational relationship between the springs 30 and 32 is random so that different portions of the involute spring elements of the spring 30 may be immersed in the damping liquid as compared with the immersed involute elements of the spring 32. Further, it is to be appreciated that when installing the geophone for use, no particular rotational orientation of the casing 10 is preferred with respect to the rotational orientation of the springs 30 and 32 to the horizontal. It is only desired that the primary axis be disposed in a substantially horizontal direction, which will insure that varying portions of the involute spring elements will be in engagement with the damping fluid.

The improvement in damping undesired orthogonal responses with the practice of the invention is graphically illustrated in FIG. 5. The displacement of the mass due to orthogonal or cross axis responses resulting in orthogonal resonant frequencies and buckling responses occurs primarily at approximately 200 to 400 hertz, in a geophone in accord with the above description which is not damped with a fluid. When this geophone is partially filled, as described, with a damping fluid, the undesired responses are significantly subdued in the range between 200 and 400 hertz, and the restraining of the undesired orthogonal vibrations has proven most beneficial in obtaining approved sensing characteristics of this type of geophone. In determining the outputs represented in FIG. 5 the relative instantaneous displacements between the magnets and masses of geophones constructed in accord with the disclosed embodiment were compared for unfilled and partially filled versions. For these tests a pair of identical geophones are related so that their primary axes lie in the same horizontal plane at right angles to each other. The geophones were driven by a force applied at 45° to both primary axes, and in this manner both orthogonal forces and forces parallel to the primary axes were sensed. As indicated, the relative displacement of the partially filled geophone elements is considerably less than in the unfilled geophones.

The undamped natural resonant frequency of the buckling mode in the diaphragm springs is:

$$W_N = \frac{1}{2\pi} \sqrt{\frac{K}{M}}$$

where
$W_N$ = the undamped natural resonant frequency in hertz,
K = the spring constant in buckling mode, pounds per inch,
M = suspended mass in slugs, equal to weight in pounds divided by gravity constant in feet per second squared.

The damped natural resonant frequency of the spring buckling mode is:

$$W_{ND} = W_N \sqrt{1 - \alpha^2}$$

where
$W_{ND}$ = damped natural resonant frequency, hertz
$\alpha$ = damping ratio, equal $C/C_C$
C = damping constant, pound seconds per inch,
$C_C$ = critical damping constant, equal to $2W_N M$.

From the above it is to be noted that the resonant frequency is shifted by an amount dependent upon the degree of damping. Since the degree to which each involute spring element engages the damping fluid varies, the resonant frequency in the buckling mode for each spring element is different. It is believed that the undesired buckling mode responses increase in severity when two or more involute spring elements are at the same resonant frequency, and the presence of the partial filled damping fluid reduces this probability significantly.

It is further believed that the improved results of the invention also partially result from the damping produced by the fluid which resists mass coil movement at right angles to the primary axis of the geophone. The resisting of this cross axis movement reduces the stress of force placed upon the involute spring elements, and as the area of the mass at right angles to the primary axis in engagement with the damping fluid is considerably greater than the area of the mass in alignment with the primary axis, or mass frontal area, the presence of the fluid tends to reduce the magnitude of the cross axis displacement on the mass.

In the practice of the invention various types of damping fluid are acceptable. In one embodiment, an inert fluoro-chemical liquid is used which is chemically nonreactive and is an electrical insulator having acceptable viscosity characteristics over a wide temperature range. A suitable liquid is available from the 3M Company identified as part number FC-78.

In geophones of the described construction a partial filling of the casing void, by volume, of one third produced the optimum suppression of orthogonal vibrations occurring in the diaphragm springs. However, it is contemplated that due to design configurations in the geophone structure, such as variations in the weight of the mass, configuration thereof, and variations in the construction of the diaphragm springs, partial fillings, by volume, of the chamber between 25% and 75% will produce improved results.

While diaphragm springs have been illustrated having three involute spring elements, it is intended that the inventive concept extend to diaphragm springs having four or more involute elements, and the inventive concepts would also be present with a diaphragm spring having only two involute elements. It will be appreciated that regardless of the number of involute elements, the partial filling of the casing void will place varying portions of the spring elements in engagement with the damping fluid to suppress resonant vibrations occurring in the spring orthogonal to the primary axis.

I claim:

1. A fluid damped geophone for sensing vibrations along a substantially horizontally oriented primary axis comprising, in combination, a casing having a primary axis and defining a chamber, a permanent magnet fixed within said casing, an annular coil circumscribing said magnet and movably mounted within said casing upon a pair of diaphragm springs for axial movement in the direction of said primary axis, said diaphragm springs each comprising an outer rim mounted upon said casing, an inner rim mounted to said coil, and a plurality of involute spring elements interconnecting said outer and inner rims extending about said primary axis, electrical conductors connected to said coil, and a damping fluid within said casing partially filling the unoccupied void within said chamber when said primary axis is substantially horizontally disposed whereby the length of said spring elements immersed in said fluid varies to suppress cross axis resonant vibrations within said springs.

2. In a fluid damped geophone as in claim 1 wherein said damping fluid occupies from 25% to 75% of the unoccupied void within said chamber.

3. In a fluid damped geophone as in claim 2 wherein said damping fluid occupies approximately one third of said unoccupied void within said chamber.

* * * * *